(12) United States Patent  (10) Patent No.: US 7,845,858 B2
Donetsky et al.  (45) Date of Patent: Dec. 7, 2010

(54) FIBEROPTIC CONNECTOR

(76) Inventors: Yurij Igorevich Donetsky, mikrorayon Dzerzhinskogo 33-70, Balashikha, Moscow Region (RU) 143913; Andrey Yurievich Donetsky, mikrorayon Dzerzhinskogo 33-70, Balashikha, Moscow Region (RU) 143913

( * ) Notice: Subject to any disclaimer, the term of this patent is extended or adjusted under 35 U.S.C. 154(b) by 0 days.

(21) Appl. No.: 12/450,364

(22) PCT Filed: Aug. 28, 2008

(86) PCT No.: PCT/RU2008/000579

§ 371 (c)(1),
(2), (4) Date: Sep. 22, 2009

(87) PCT Pub. No.: WO2009/078748

PCT Pub. Date: Jun. 25, 2009

(65) Prior Publication Data

US 2010/0092134 A1   Apr. 15, 2010

(30) Foreign Application Priority Data

Dec. 17, 2007   (RU) ............................. 2007146403

(51) Int. Cl.
   *G02B 6/36*   (2006.01)
(52) U.S. Cl. ............................. 385/59; 385/60; 385/62; 385/72; 385/135; 385/136
(58) Field of Classification Search ............. 385/59–60, 385/62, 71, 72, 135, 136
See application file for complete search history.

(56) References Cited

U.S. PATENT DOCUMENTS

| 7,118,281 | B2 * | 10/2006 | Chiu et al. | 385/53 |
| 7,318,677 | B2 * | 1/2008 | Dye | 385/78 |
| 2010/0202736 | A1 * | 8/2010 | Roth | 385/59 |

FOREIGN PATENT DOCUMENTS

| DE | 20308264 | 9/2003 |
| EP | 1783524 | 5/2007 |
| RU | 1806400 | 3/1993 |
| RU | 2064687 | 7/1996 |
| RU | 97116948 | 7/1999 |

\* cited by examiner

*Primary Examiner*—Hemang Sanghavi
(74) *Attorney, Agent, or Firm*—Aleksandr Smushkovich

(57) ABSTRACT

The proposed optic-fiber connector is used for interconnecting optic-fiber cables. It comprises a receptacle with spring-loaded centralisers and two plugs with ferrules. The centraliser at each side includes an embracing portion, fixed end, movable end furnished with projections. The receptacle includes two sliders, each having a lock with a releasing knob. Each plug is provided with —a movable grid for compressing a spring-loaded insertion, —an arm for moving the grid, and —a fixing device. The embracing portions tightly encompass the ferrules. The slider essentially fixes the plug in the receptacle, and releases the grid for displacement. The insertion produces a force required for compressing the counterpart ferrules. The connector's design facilitates connection and disconnection, provides a small size, while connecting a multitude of optic-fibers, increases the adjustment accuracy producing a required force to depress the ferrules of connected waveguides, eases field connection works, and allows avoiding switches in fiberoptic networks.

3 Claims, 7 Drawing Sheets

FIBEROPTIC CONNECTOR

CROSS-REFERENCES TO RELATED APPLICATIONS

This application is a U.S. national phase application of a PCT application PCT/RU2008/000579 filed on 28 Aug. 2008, published as WO2009078748, whose disclosure is incorporated herein in its entirety by reference, which PCT application claims priority of a Russian Federation patent application RU2007146403 filed on 17 Dec. 2007.

FIELD OF THE INVENTION

This invention belongs to the field of fiber optics and optonics. It can be used to connect groups of fiberoptic (herein also called 'optic-fiber') cables in systems where optic-fiber ends have to be disconnected or connected easily.

BACKGROUND OF THE INVENTION AND RELATED ART

Optic-fiber connectors and contacts are used in optonics to connect waveguides. An optic-fiber connector or contact serves the purpose of precisely aligning and locking the cores of optical fibers to enable the transmission of the optical signal from one fiber to another with minimum losses. Modern connectors normally use the following calibration principle: the fibers are positioned in precision ferrules, which are inserted into a centraliser. The centralisers are installed within a receptacle into which plugs containing the fiber ferrules are inserted at both ends. To minimize signal reflection, there should be no air gap between the paired fiber cores. This is ensured by the spherically-shaped fiber ends. The connector ferrules have a spring-loaded mechanism that ensures appropriate compressive force between paired ferrules. In the majority of ferrule designs, this force essentially equals 10 N. The controlled compressive force ensures the absence of an air gap between the ferrules. The connector is locked in the plug using either one of the following principles: push-pull (SC connector), bayonet locking (ST connector), or nut locking (FC connector). The majority of existing connectors are designed for connecting two waveguides.

Prior art describes a technology for connecting optic-fiber trunk cables (containing two or more optic fibers), which uses MT/MTP connectors for connecting 4, 8, or 12 optic fibers; switching panels (switches or cross panels) with a fan-like assembly of connecting cables (fanout unit) with a second connector. Installing and connecting cables, with MT or MTP connectors mounted by the manufacturer, does not require any special tools, since there is no need to perform cable termination. Strips containing 4, 8, or 12 optic fibers are matched within an MT connector. MT connectors are connected by means of 2 calibration pins and a spring-loaded lock. The connecting cables that form the fanout unit are short sections of optic fibers, one end of which is locked in an MT connector and the other end is locked in ordinary connectors (ST, SC, FC). The fanout unit of connecting cables is mounted onto the universal switch. The MT connector of the cable is coupled with the MT connector of the fanout unit, while the ordinary connectors are coupled with the respective switch adapters. This allows connecting up to 24 fibers in a single switch (with two sets of MT connectors used). Implementing this technology requires two switches equipped with fanout units of connecting cables, a cable of the requisite length with MT (MTP) connectors mounted on its ends by the manufacturer. The shortcomings of this technology include the need for intermediate switching equipment (fanout unit, switches), which results in greater losses in the line and a limited number of fibers per connector.

Prior art describes a multi-channel fiber-optic hybrid contact (FOHC) by ITT Cannon (www.ittcannon.com), which has been chosen as a prototype (the nearest related art reference) for this invention. It consists of a plug and a receptacle. The plug contains a matrix of optic-fiber ferrules of a trunk cable. Each ferrule has a spring-loaded mechanism that ensures the requisite compressive force when the connector is connected. The receptacle contains a matrix of centralisers mounted within the receptacle case. Ferrules of optical unit cables (identical to the fanout unit used in the MT technology) are inserted into the matrix. The coupled connector is locked by means of a nut. In FOHC connectors, the method of connecting/disconnecting connectors is simpler in operation compared to MT/MTP connectors, and FOHC connectors have a longer service life. Meanwhile, installation of centralisers within the receptacle and ferrules in the plug require high precision manufacturing, which is why cables are connected to the connector only in industrial conditions. These connectors require a fanout unit (much like the MT technology), which increases insertion losses when this type of connector is used.

BRIEF DESCRIPTION OF THE INVENTION

The present invention provides the following technological results:

simplified connection and disconnection of the inventive connector, having one or two male plugs and a female receptacle;

small dimensions of the connector with a large number of connected fibers;

improved precision of calibration and application of the requisite compressive force between fiber ends (ferrules) for each pair of connected optic fibers;

possibility to install optic fibers into optic-fiber plugs in the field conditions. This makes it possible to eliminate switches from optic fiber networks.

The aforesaid technological results are achieved by the following measures:

A) The connector's receptacle comprises a plurality of centralisers made of a flexible material, having a hollow cylinder shape with a vertical slot along the entire height thereof. The centraliser parts (herein called 'embracing portions', having a 'C'-like cross-section), from the edges of hollow cylinders to the point where the plug ferrules are connected inside the centraliser, can vary their aperture so that the optic-fiber ferrule of the plugs can freely enter the embracing portions from the opposite sides of the centraliser.

One of the slot edges of each centraliser is fixed in the receptacle material. On the other slot edge (a 'free' edge) of the centraliser, there are projections positioned on each side of the inserted ferrules. The projections can move so that the aperture of embracing portion, surrounding the plug ferrules increases or decreases at each side of the optic fiber receptacle.

The receptacle comprises a slider including a frame with a grid of plates extending alongside the centralisers. The slider can move in the transverse direction relative to the axes of centraliser cylinders.

The slider plates have grooves for the projections on the free edges of the centralisers, which either allow the slider to move the projections on the edges of centralisers or allow the projections to move the slider.

There are open-position locks that can releasably fix the receptacle in an open state. They can retain the sliders in the position wherein the aperture of embracing portions allows free passage of the plug ferrules.

The receptacle includes knobs capable of releasing the open position locks, which knobs are located essentially at the center of each side of the receptacle, where the centraliser ends are protruding. The knob releases the lock when pressed by the body of the plug inserted into the receptacle.

The receptacle has arms that allow moving the sliders into a position that makes it possible to freely extract each plug from the receptacle.

B) Each optic fiber plug comprises:

a moving grid. The grid can compress the flexible material or springs of the spring-loaded device of each ferrule;

an arm for displacing the grid in the direction that causes the grid to compress the flexible material or springs of the spring-loaded device of each ferrule. The grid displacing arm impels the grid, which is used to disconnect the plug from the receptacle;

a grid fixing device. It can lock the grid in a position where it keeps the flexible material or springs of the spring-loaded device of each ferrule in a compressed state. Being actuated substantially by the receptacle, the grid fixing device releases the grid into a position where the flexible material or the spring-loaded mechanism can apply a compressive force essentially to each ferrule.

PREFERRED EMBODIMENTS OF THE PRESENT INVENTION

Figure 1:
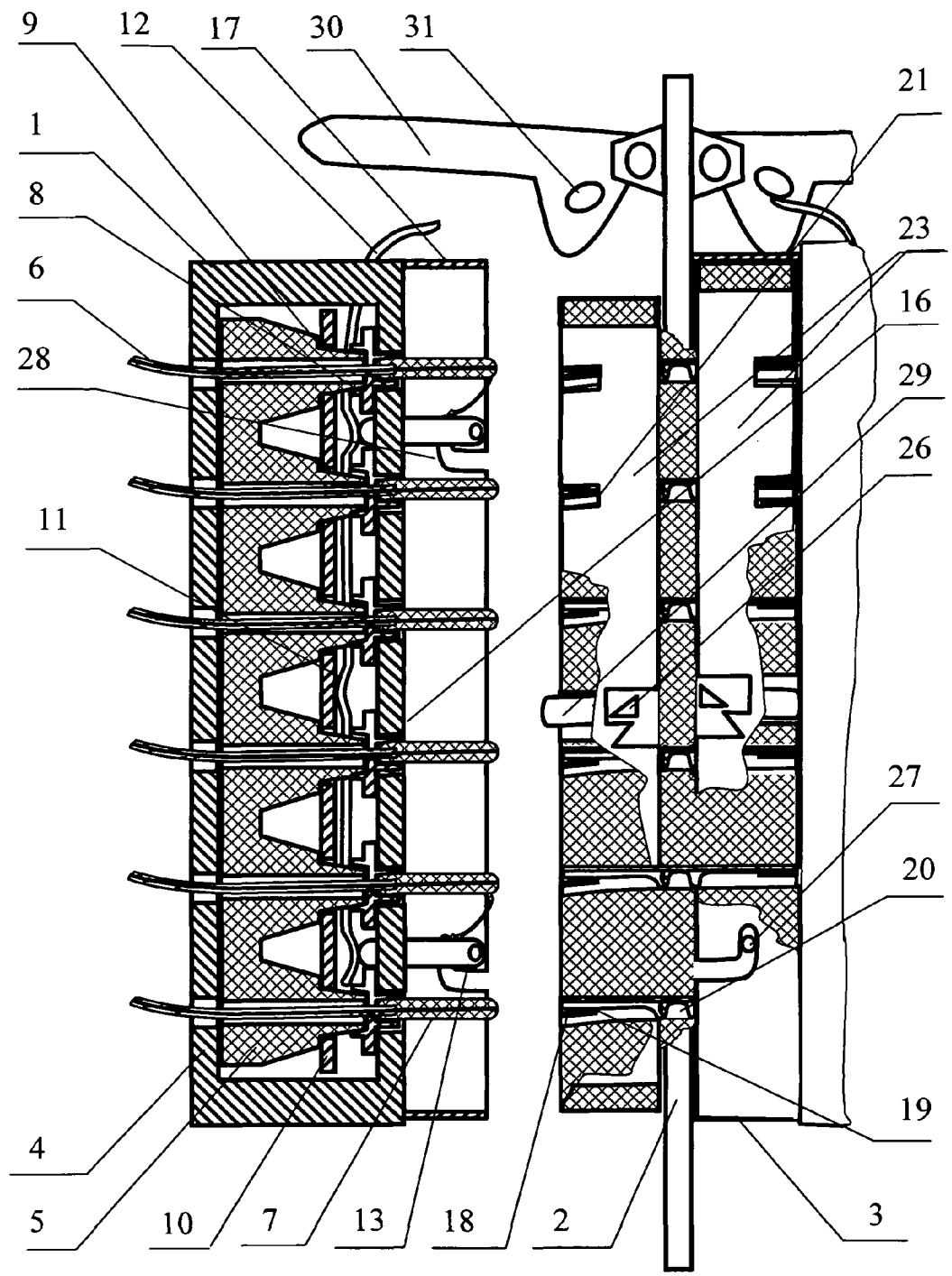
FIG. 1 shows a side view of an optic-fiber connector with one plug connected to the receptacle and the other plug ready to be connected.

While the invention may be susceptible to embodiment in different forms, there are shown in the drawings, and will be described in detail herein, specific embodiments of the present invention, with the understanding that the present disclosure is to be considered an exemplification of the principles of the invention, and is not intended to limit the invention to that as illustrated and described herein.

A preferred embodiment of the optic-fiber connector comprises: a first male plug (1) (illustrated on FIG. 1) capable to be connected to a female receptacle (2), and a second male plug (3) connected to the receptacle (2).

The plug (1) comprises a housing case (4) that contains an insertion (5) made of flexible material, so that the insertion is being spring-loaded. The insertion (5) has a plurality of openings, through which optic fiber cables (6), furnished with ferrules (7) can be passed. The insertion (5) is shaped in a way that allows compressing each ferrule (7) via a corresponding ferrule holder (8), retaining the ferrule (7), with a predetermined pressure (substantially about 10 N) so that the neighboring ferrules (7) would not affect one another's compressive force. The insertion (5) has a plurality of projections (9), supporting a displaceable grid (10), so that grid (10) is capable of compressing via the projections (9) a portion of the insertion (5) around each optic fiber cable (6). The grid (10) retains the insertion (5) in a compressed state by means of a lug (11) arranged on a grid moving arm (12), which is releasably retained by a grid fixing device (13).

Figure 3:
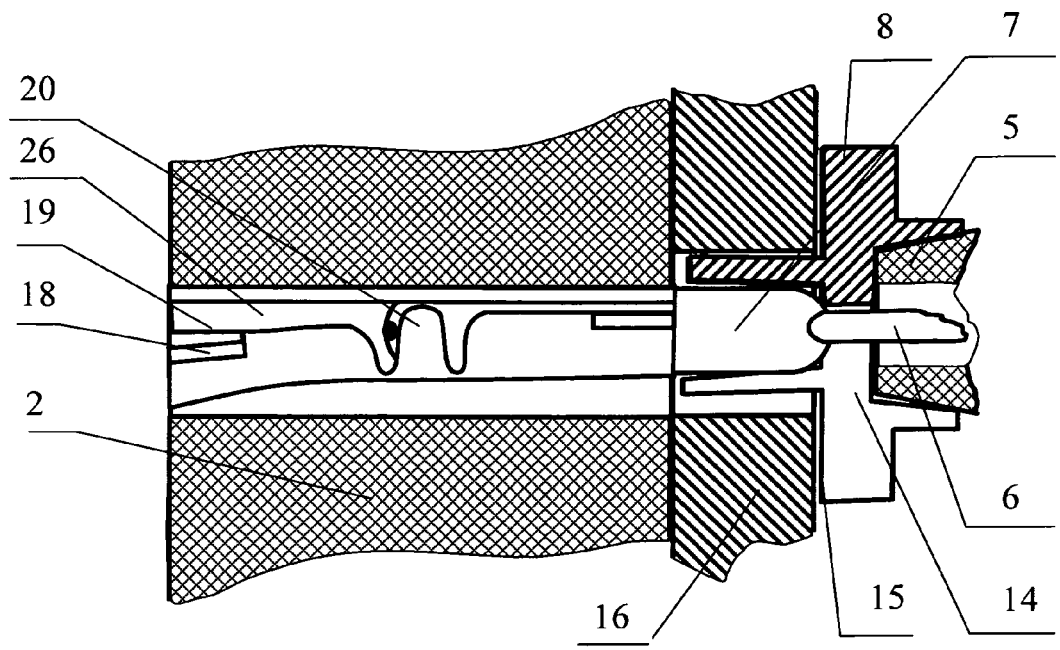
FIG. 3 shows a fragment of the optic-fiber receptacle with a centraliser, with an optic fiber ferrule inserted on one side, with the other side open for insertion of the paired ferrule.

The ferrule holder (8) (FIG. 3) is executed in the form of a bushing with an orifice (14) (FIG. 3) for passing the optic fiber cable (6). The fiber ferrule (7) is locked on one side of the bushing, the other end is spring-loaded with the insertion (5). A compression area (15) (FIG. 3) is situated on the outside of the bushing that enables the holder (8) of applying a pressure to the inside of a frontal panel (16) of the case (4). Parts of the ferrules (7) protruding from the frontal panel (16) are situated within a protective jacket (17) coupled to the case (4) (FIG. 1). The jacket (17) has specially profiled slots (28) (FIG. 1).

The receptacle (2) comprises a base accommodating a plurality of centralisers (20), arranged in rows, made of a flexible material, and having a hollow-cylinder shape with a predetermined vertical slot along the entire height thereof. The internal surface of each centraliser (20) defines an embracing portion (25) (FIG. 5) that can vary its aperture, so that the ferrule (7) of the plug can freely enter the embracing portion (25). A first edge (24) of the vertical slot of each centraliser is fixed in the base of receptacle (2). A second edge (19) of the slot has projections (18) positioned at each side of the inserted ferrules (7). The projections (18) can approach or withdraw from the edge (24) so that the aperture of the embracing portion (25), surrounding the ferrule (7), respectively decreases or increases at each side of the receptacle (2).

The receptacle (2) comprises a slider (23) (FIGS. 1, 2, 5, 6, 8) including a frame with a grid of plates (22) extending alongside the centralisers (20). The slider (23) has specially configured protrusions (27) (FIGS. 1, 2, 6) for interaction with the slots (28). The slider (23) can move in the transverse direction relative to the axes of centralisers (20). The plates (22) have grooves (21) (FIGS. 1, 5, 7, 8) for accommodating the projections (18), which either allow the slider (23) to move the projections (18) or allow the projections (18) to move the slider (23).

The receptacle (2) comprises open-position locks (26) (FIG. 1, at least one at each side facing the male plugs) capable of releasably fixing the receptacle (2) in an open state for each male plug. The locks (26) can retain the sliders (23) in the position wherein the aperture of embracing portions (25) allows free passage of the ferrules (7).

The receptacle (2) comprises two knobs (29) capable of releasing the open position locks (26) (FIG. 1), which are located substantially at the center of each side of the receptacle (2). The knobs (29) release the locks (26), when pressed by the male plug (1) or (3), inserted into the receptacle (2).

The receptacle (2) comprises arms (30) (FIGS. 1, 2) that allow moving the sliders (23) into a position that makes it possible to freely extract each male plug from the receptacle (2). The arms (30) have specially configured projections (31) (FIGS. 1, 2) for interaction with the arm (12) of male plugs.

Figure 5:
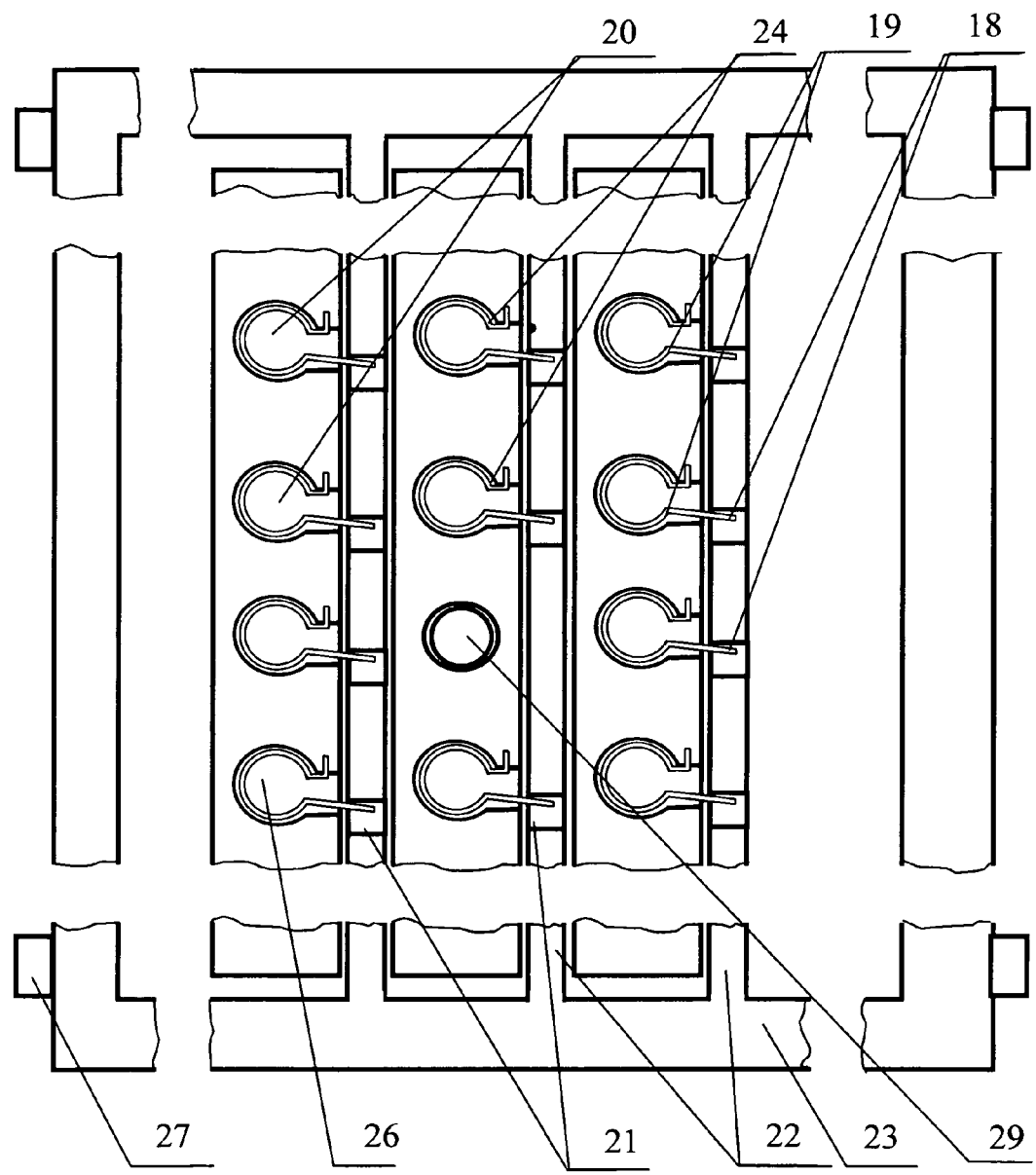
FIG. 5 shows a plan view of a fragment of the receptacle in which the slider retains the centralisers in the open state.
Figure 6:
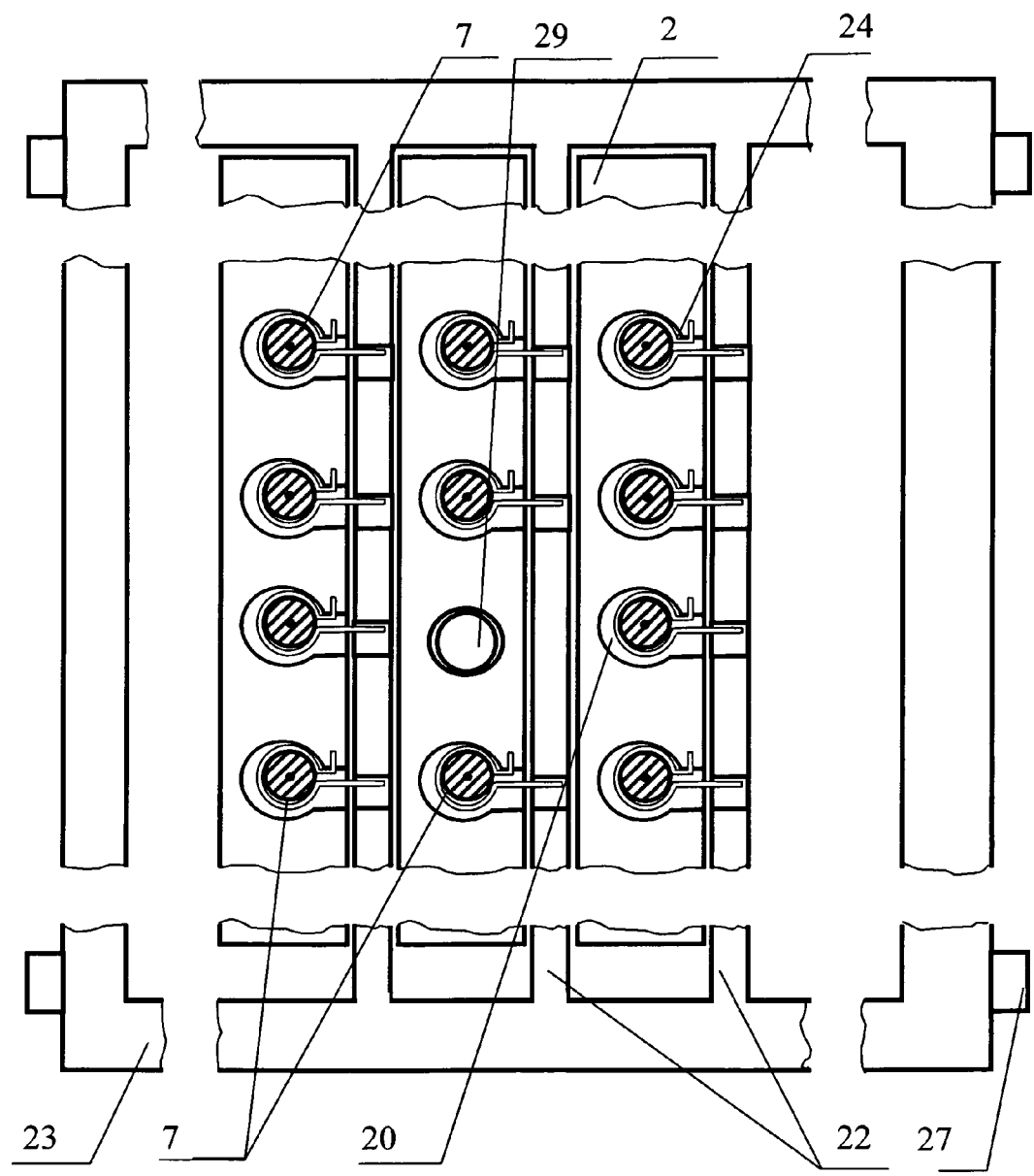
FIG. 6 shows a plan view of a fragment of the receptacle in which the centralisers retain the plug ferrules and the slider in the shifted position.
Figure 7:
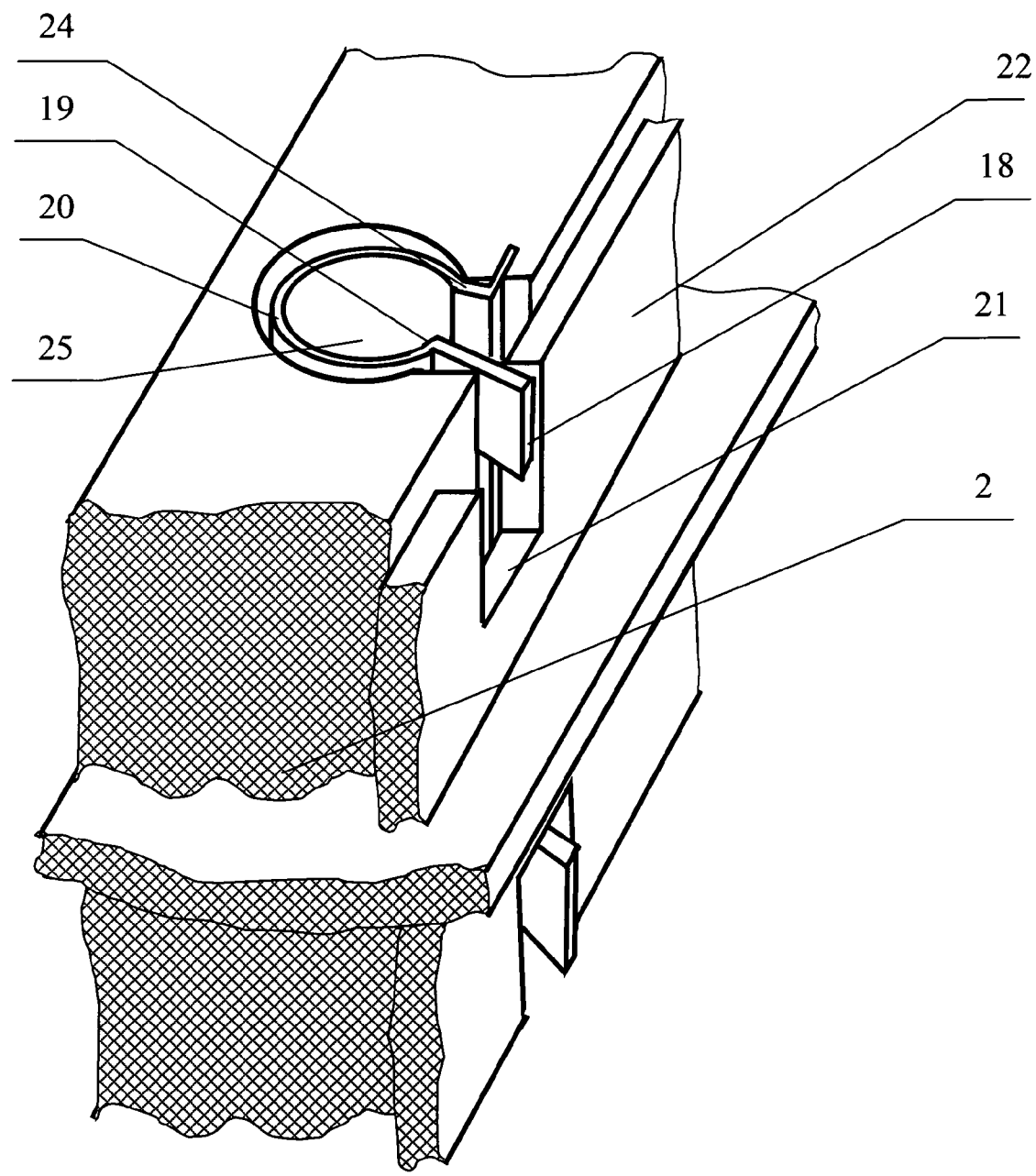
FIG. 7 shows a spatial view of a fragment of the receptacle with the centraliser on both sides in a position ready for insertion of the ferrules being connected.
Figure 8:
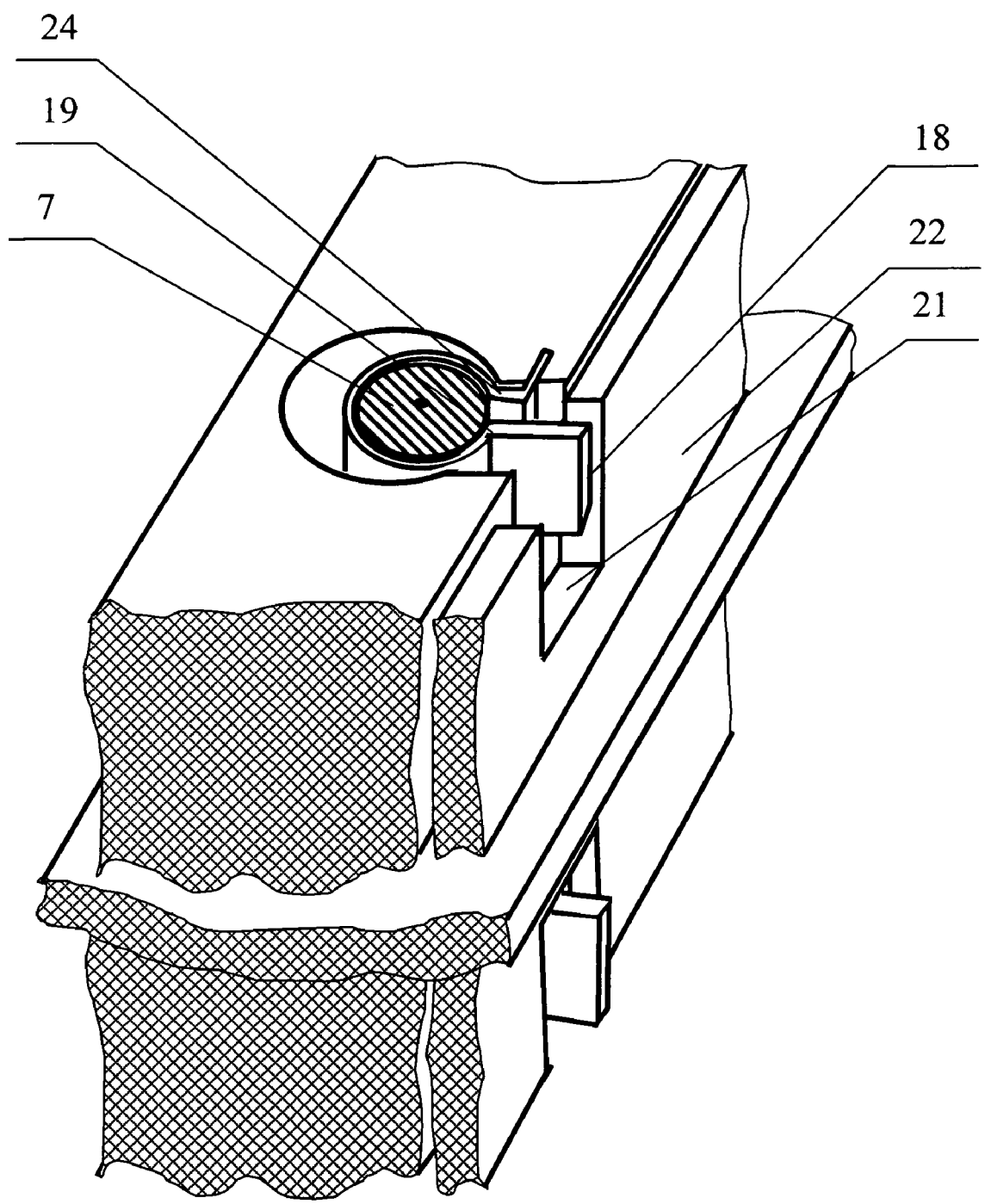
FIG. 8 shows a spatial view of a fragment of the receptacle with a centraliser, with ferrules of connected fibers inserted into it on both sides.

During operation, the projection (18), while being in the groove (21), is retained by the slider (23) and uses the elasticity of the centraliser's material to prevent the end (19) from moving toward the end (24). This results in widening the embracing portions (25) that allows free passage of the ferrules (7). The slider (23) is retained by the lock (26), which prevents it from moving, despite it's compelled by the elastic force of the centralisers (20) transmitted via the projections (18) (FIGS. 5, 7).

Figure 2:
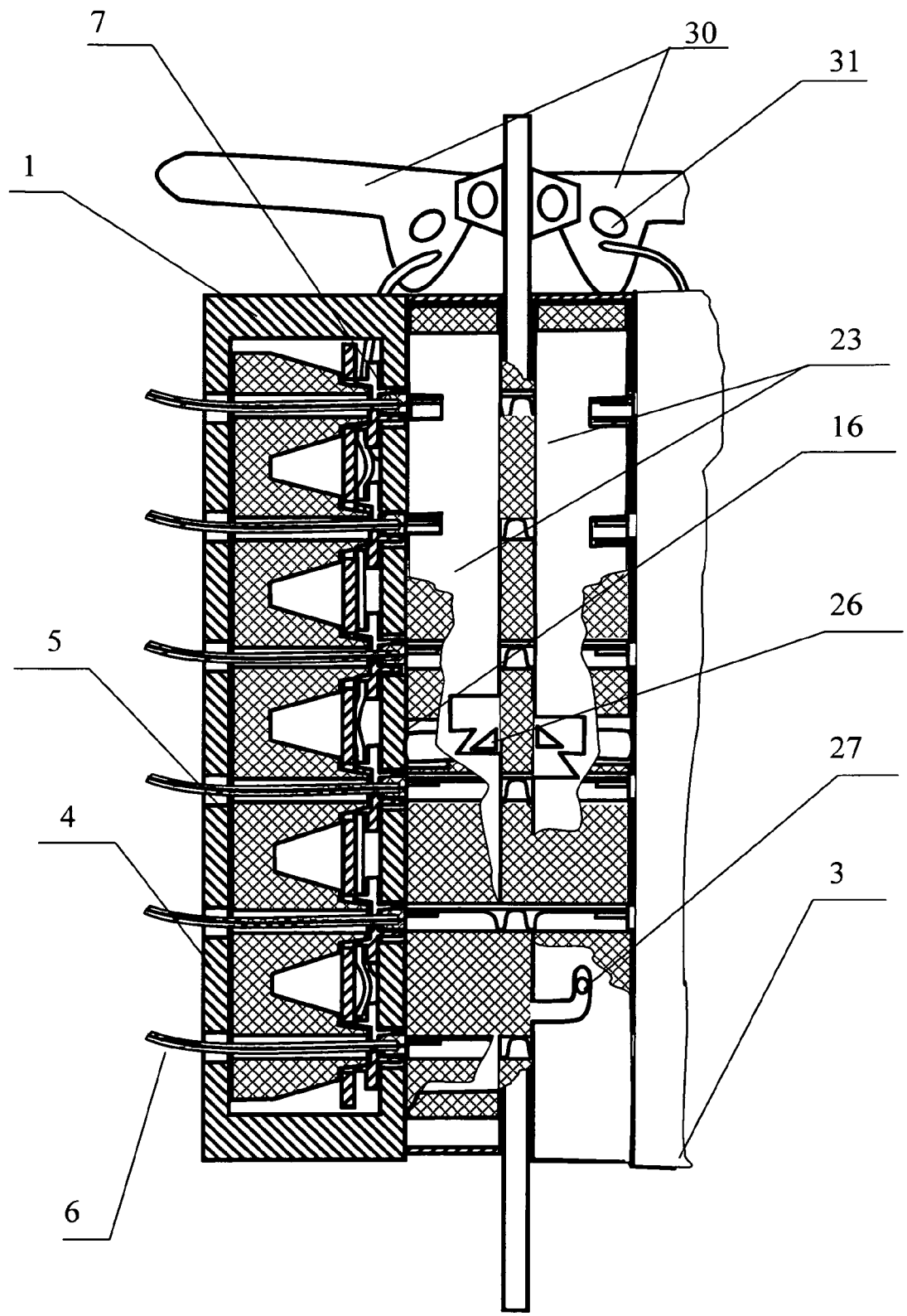
FIG. 2 shows a side view of an optic-fiber connector with both plugs connected to the receptacle.
Figure 4:
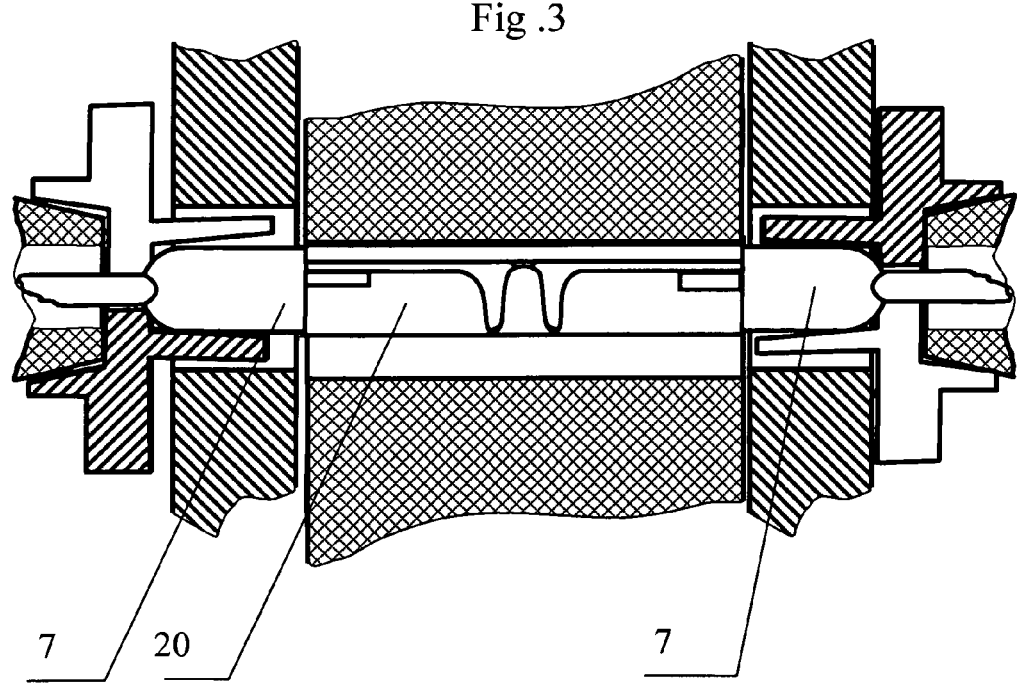
FIG. 4 shows a fragment of an optic fiber-receptacle with a centraliser with the ferrules connected.

When the plug (1) is inserted into the receptacle (2), each of the ferrules (7) enters the centraliser (20). The widened embracing portion (25) (FIGS. 3, 7) allows the ferrule (7) to pass freely into. The protrusions (27) enter the profiled slots (28) (FIGS. 1, 2). When the ferrules (7) fully enter the embracing portions (25) intended therefor, the ferrules (7) of plug (1) (FIG. 4) will press against the ferrules (7) of plug (3) with a predetermined compressive force created by the parts of the flexible material of insertion (5) between the ferrule holders (8) (FIG. 2) and the projections (9) (the parts that are not compressed by the grid (10)).

The plug (1) presses with its frontal panel (16) on the knob (29) of the lock (26). The slider (23) is released to move. The movable ends (19) (FIGS. 6, 8) with the projections (18) move toward the ends (24). This reduces the dimensions of embracing portions (25) to a aperture whereby they encompass the ferrules (7) of the plug (1) (FIG. 2). At the same time, the plates (22) shift between the rows of centralisers (20) (FIG. 6), and the protrusions (27), while moving in the profiled slots (28) (FIG. 1), actuate the grid fixing device (13), which releases the movable grid (10) (FIG. 2) and the arm (12) that shift in the direction of the internal surface of the frontal panel (16), being impelled by the compression force of the flexible material insertion (5). Being released from the pressure of the grid (10), the flexible material insertion (5) creates the required force (~10N) to compress the ends of ferrules (7) of the male plugs (1) and (3) against each other.

Proper connection of the male plug and the receptacle is signaled by a click of the lock (26) and visually by the change in the position of the arm (12). In this position, all the ferrules (7) are encompassed by centralisers (20), since the grid fixing device (13) can open only when the slider (23) is in its farthermost position, when all the apertures of the embracing portions (25) decrease to match the size of ferrules (7). This ensures a precise adjustment and locking of the cores of connected optical fibers (6), since the predetermined compression force (~10N) is applied only after the ferrule has been coaxially aligned with the counterpart ferrule of the other male plug, substantially making the adjustment process error-free.

This results in reduced requirements to the precision of installation of the plug ferrules, which allows connecting the optical fibers to the plug in field conditions. The receptacle (2) retains the plug (1) by means of protrusions (27) engaged with the profiled slots (28). The plates (22) are retained by the projections (18) in a position that does not prevent the centralisers (20) from reliably aligning the cores of connected optical fibers (6). The lock (26) and the knob (29) are retained by the slider (23) in a sunken position.

To extract the plug (1) from the receptacle (2) (FIG. 2), one should push the arm (30) toward the connector. When turned, the projection (31) actuates the arm (12), which causes the grid (10) to compress the flexible material insertion (5) and to be fixed by the grid fixing devices (13). A continued turning of the arm (30) causes the slider (23) to move together with the projections (18), releasing the ferrules (7) of the plug (1). After the arm (30) is released, the slider (23), being pushed by the elastic force of centralisers (20), will return to a position in which it will be retained by the lock (26) (FIG. 1). At the same time, the protrusions (27) will move through the profiled slots (28) into a position wherein the plug (1) will be freely extracted from the receptacle (2), and the knob (29) will rise above the receptacle (2). Thusly, the optic fiber connector returns to its original unconnected state (FIG. 1, FIG. 3, FIG. 5, FIG. 7).

Therefore, the proposed optic fiber connector is easy to operate, as a single effortless movement of the user makes a connection with the adjustment and locking of all pairs of cores of the optical fibers being connected. Once the ferrules of the plug (1) become aligned with the counterpart ferrules of the plug (3), the flexible material insertion (5) will automatically compress the ends of optical cables (6) with the predetermined force (~10N). This essentially eliminates errors from the adjustment process and results in reduced requirements to the precision of installation of the plug ferrules, which allows connecting the optical fibers to the plug in field conditions. With a single turn of the arm (30), the optical fiber ferrules are released, allowing the male plug to be easily extracted from the receptacle.

The invention claimed is:

1. A fiberoptic connector comprising at least one male plug and a female receptacle, wherein each said plug including:
    a housing means;
    a plurality of fiberoptic cables inserted into said housing means and each said cable is connected to a ferrule, each said ferrule is supported by a holder embracing and retaining the ferrule with a predetermined pressure;
    spring-loaded means for flexible support of said holders, said spring-loaded means are mounted in said housing means;
    a displaceable grid mounted in said housing means;
    a plug arm capable of displacing said grid in a direction that causes the grid to compress and release said spring-loaded means, thereby enabling disconnection of substantially said plug from said receptacle, said plug arm is mounted in said housing means; and
    grid fixing means for locking said grid in a position where it keeps said spring-loaded means in a compressed state, and for releasing said grid into a position where said spring-loaded means, being in a released state, can apply a predetermined compressive force to each said holder, thereby providing proper connection substantially of said plug to said receptacle.

2. The connector according to claim 1, comprising two said male plugs and one said female receptacle, wherein said receptacle comprises:
    a base means;
    a plurality of elastic centralisers, associated with said base means, and arranged in rows, said centralisers have a substantially hollow-cylinder shape with a vertical slot along the entire height thereof; the internal surface of each said centraliser defines an embracing portion of a variable aperture, enabling each said ferrule to be freely inserted into said embracing portion at both sides of the centraliser and to be gripped thereby; a first edge of the vertical slot is fixed in said base means, a second edge of the slot has two projections, each said projection is positioned at each side of the centraliser, facing each said plug; said projections are capable of approaching or withdrawing from the first edge providing the variable aperture of said embracing portion at each side of the receptacle;
    two sliders associated with said base means, and situated one at each side facing said plugs, each said slider includes a frame with a plurality of plates extending alongside said centralisers; each said slider is movable in the transverse direction relative to the axes of said centralisers; said plates have grooves for accommodating said projections;

two open-position locks, associated with said base means and situated one at each side facing said plugs, said locks are capable of releasably fixing the receptacle in an open state for each said plug and of retaining said sliders in the position wherein the aperture of said embracing portions allows free passage of said ferrules;

two knobs, associated with said base means and situated one at each side facing said plugs, said knobs are capable of releasing said locks when pressed substantially by said plugs inserted into the receptacle;

receptacle arms capable of moving said sliders into a position that enables freely extracting each said plug from the receptacle, said receptacle arms are configured to interact with said plug arm.

3. A fiberoptic connector comprising two male plugs, each including a plurality of ferrules, and a female receptacle, wherein said receptacle comprises:

a base means;

a plurality of elastic centralisers, associated with said base means, and arranged in rows, said centralisers have a substantially hollow-cylinder shape with a predetermined vertical slot along the entire height thereof; the internal surface of each said centraliser defines an embracing portion of a variable aperture, enabling each said ferrule to be freely inserted into said embracing portion at both sides of the centraliser and to be gripped thereby; a first edge of the vertical slot is fixed in said base means, a second edge of the slot has two projections, each said projection is positioned at each side of the centraliser, facing each said plug; said projections are capable of approaching or withdrawing from the first edge providing the variable aperture of said embracing portion at each side of the receptacle;

two sliders associated with said base means, and situated one at each side facing said plugs, each said slider includes a frame with a plurality of plates extending alongside said centralisers; each said slider is movable in the transverse direction relative to the axes of said centralisers; said plates have grooves for accommodating said projections;

two open-position locks, associated with said base means and situated one at each side facing said plugs, said locks are capable of releasably fixing the receptacle in an open state for each said plug, and of retaining said sliders in the position wherein the aperture of said embracing portions allows free passage of said ferrules;

two knobs, associated with said base means and situated one at each side facing said plugs, said knobs are capable of releasing said locks when pressed substantially by said plugs inserted into the receptacle;

receptacle arms capable of moving said sliders into a position that enables freely extracting each said plug from the receptacle, said receptacle arms are configured to interact substantially with said plugs.

* * * * *